United States Patent
Botker et al.

(10) Patent No.: US 7,511,563 B2
(45) Date of Patent: Mar. 31, 2009

(54) RIPPLE CURRENT REDUCTION CIRCUIT

(75) Inventors: Thomas L. Botker, Andover, MA (US); Benjamin A. Douts, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/895,462

(22) Filed: Aug. 23, 2007

(65) Prior Publication Data

US 2009/0051415 A1    Feb. 26, 2009

(51) Int. Cl.
*G05F 1/10* (2006.01)
*G05F 3/02* (2006.01)

(52) U.S. Cl. ............... 327/536; 327/537; 327/538; 327/541; 327/310; 327/551

(58) Field of Classification Search ......... 327/148, 327/157, 536–543, 34, 310, 313, 551; 363/59, 363/60; 323/315
See application file for complete search history.

(56) References Cited

U.S. PATENT DOCUMENTS

| | | | |
|---|---|---|---|
| 5,451,898 A * | 9/1995 | Johnson | 327/563 |
| 6,414,863 B1 | 7/2002 | Bayer et al. | 363/60 |
| 6,661,683 B2 | 12/2003 | Botker et al. | 363/60 |
| 6,794,923 B2 | 9/2004 | Burt et al. | 327/382 |
| 7,068,094 B1 * | 6/2006 | Jamal et al. | 327/541 |
| 2004/0095186 A1 * | 5/2004 | Bernard | 327/539 |
| 2005/0174099 A1 * | 8/2005 | Ohkubo et al. | 323/315 |

OTHER PUBLICATIONS

Burr-Brown Products From Texas Instruments; 1.8V, 7MH$_z$, 90dB CMRR, Single-Supply, Rail-to-Rail I/O Operational Amplifier; OPA363, OPA2363, OPA364, OPA2364, OPA4364; SBOS259B-Sep. 2002; Revised Feb. 2003; pp. 1-25.
Linear Technology; "Low Noise, Voltage-Boosted Varactor Driver"; LTC1340; pp. 1-8.

(Continued)

*Primary Examiner*—Long Nguyen
*Assistant Examiner*—Brandon S Cole
(74) *Attorney, Agent, or Firm*—Koppel, Patrick, Heybl & Dawson

(57) ABSTRACT

A ripple current reduction circuit includes a supply node coupled to the output of a high ripple voltage source such as a charge pump. A first current mirror is referred to the supply node and mirrors a current I1 to a second node, the mirrored current (I3) including a ripple current induced by the ripple voltage. A second current mirror is referred to the second node and mirrors a current I2 to an output node, which provides a current $I_{LOAD}$ to a load. The mirrors are sized such that the current provided at the second node is greater than the current required by the second mirror to provide $I_{LOAD}$. The excess current, at least a portion of which includes a ripple component induced by the ripple voltage, is shunted to ground. As such, the magnitude of the ripple component in $I_{LOAD}$ is less than that present in I3.

17 Claims, 3 Drawing Sheets

OTHER PUBLICATIONS

Linear Technology; "Double Charge Pumps With Low Nose Linear Regulator"; LTC1682/LTC1682-3.3/LTC1682-5; pp. 1-12.

Texas Instruments; "170-μVrms Zero-Ripple Switched Cap Buck-Boost Converter for VCO Supply"; TPS60240, TPS60241, TPS60242, TPS60243; SLVS327B-Jun. 2001; Revised Jan. 2002; pp. 1-22.

Burr-Brown Products From Texas Instruments; "Precision, Rail-to-Rail I/O Instrumentation Amplifier"; INA326, INA327; SBOS222D-Nov. 2001; Revised Nov. 2004; pp. 1-22.

Linear Technology; Doubler Charge Pump With Low Noise Linear Regulator in Thinsot; LTC1928-5; pp. 1-8.

PCT Notification of the International Search Report and the Written Opinion of the International Searching Authority, Dated Dec. 12, 2008; for International Application No. PCT/US2008/009514.

* cited by examiner

RIPPLE CURRENT REDUCTION CIRCUIT

BACKGROUND OF THE INVENTION

1. Field of the Invention

This invention relates generally to switching circuits, and, more particularly, to means for reducing ripple currents that arise in such circuits.

2. Description of the Related Art

Many electronic circuits include signals which are created by a periodic switching means. For example, a switching voltage regulator creates an output voltage by controlling the flow of current through an inductor with a switching circuit. This switching can give rise to ripple voltages in one or more of the circuit's signals, which are generally undesirable.

One circuit which is particularly prone to ripple voltages is the charge pump. Charge pumps are electronic circuits that use capacitors as energy storage elements to convert DC voltages into other DC voltages; switches are used to control the connection of voltages to one or more capacitors. For instance, to generate a higher voltage, during a 'charging' phase, a capacitor is connected across a voltage and charged up. In a 'transfer' phase, the capacitor is disconnected from the original charging voltage and reconnected with its negative terminal to the original positive charging voltage. Because the capacitor retains the voltage across it (ignoring leakage effects), the positive terminal voltage is added to the original, effectively doubling the voltage. Note that a charge pump could alternatively be configured to provide a negative output voltage.

A basic charge pump is shown in FIG. 1a. During the charging phase, switches S2 and S3 are closed and S1 and S4 are open, and capacitor C is charged to a voltage $V_C$ which is approximately equal to VDD. During the transfer phase, switches S2 and S3 are opened and S1 and S4 are closed, making the voltage at the output terminal OUT equal to $VDD+V_C \approx 2*VDD$.

A 'reservoir' capacitor $C_R$ is typically connected across the output to smooth out the output waveform. However, due to the switching required to operate the charge pump, there is still a considerable ripple present in the output voltage. When the charge pump output is used to, for example, provide a supply voltage for an operational amplifier, this output ripple can feed through to and unacceptably degrade the output of the amplifier.

SUMMARY OF THE INVENTION

A ripple current reduction circuit is presented which overcomes the problems noted above. The present invention is suitably driven by the output of a charge pump, though it would be useful with any voltage source having a high ripple content. The ripple current reduction circuit includes a supply node which is coupled to the output of the voltage source having an associated ripple voltage. A first current mirror is referred to the supply node, and arranged to mirror a current I1 provided by a first current source to a second node; the mirrored current (I3) has an associated ripple current induced by the ripple voltage. A second current mirror is referred to the second node, and arranged to mirror a current I2 provided by a second current source to an output node. A shunt circuit is connected between the second node and a circuit common point, and arranged to shunt a portion of the ripple current provided at the second node to the common point. When the circuit is properly arranged, the magnitude of the ripple component in the current provided at the output node is less than that present in I3.

The output node is suitably coupled to drive a load requiring a current $I_{LOAD}$, with the second current source and mirror sized as needed to provide $I_{LOAD}$ at the output node. The second current mirror is preferably driven with a fixed current, and thus presents an approximately constant load to the output of the first current mirror. The first current source and mirror are preferably sized such that current I3 is greater than that required by the second mirror to provide $I_{LOAD}$.

Since the current required by the second mirror is fixed, the excess current—i.e., the difference between I3 and the current required by the second mirror to provide $I_{LOAD}$—is shunted to the circuit common point. At least a portion of the shunted current includes a ripple component induced by the ripple voltage present in the source voltage; as such, the magnitude of the ripple component in the current provided to the load is reduced.

The shunt circuit may be a single FET, or a more complex circuit. The shunt circuit is preferably arranged to present a low impedance at the second node, which acts to further reduce the ripple current provided to the second current mirror.

These and other features, aspects, and advantages of the present invention will become better understood with reference to the following drawings, description, and claims.

DETAILED DESCRIPTION OF THE INVENTION

Figure 1A:
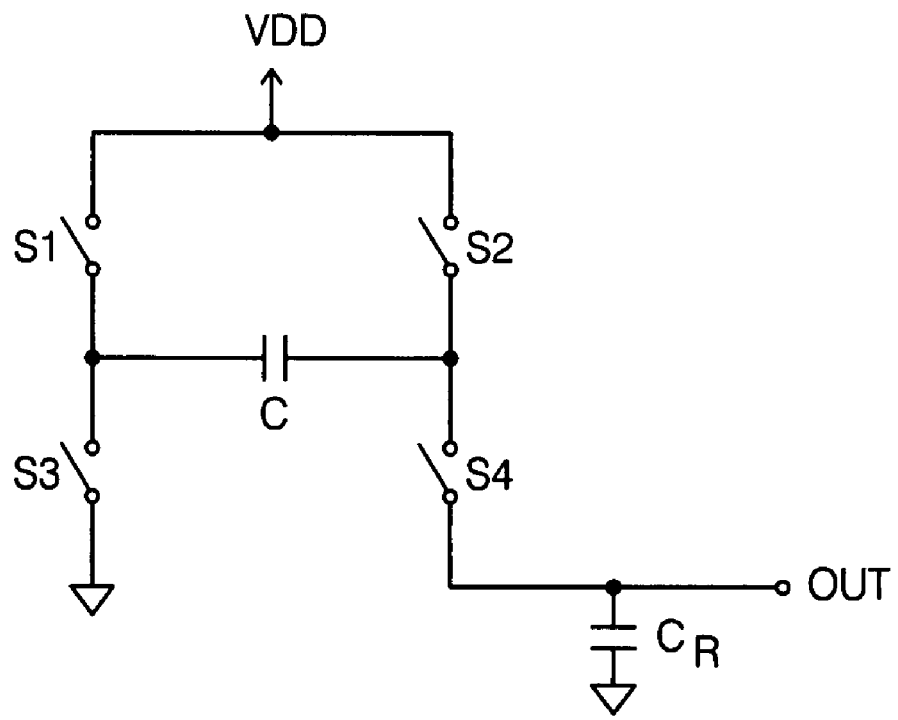
FIG. 1a is a schematic diagram of a known charge pump.
Figure 1B:
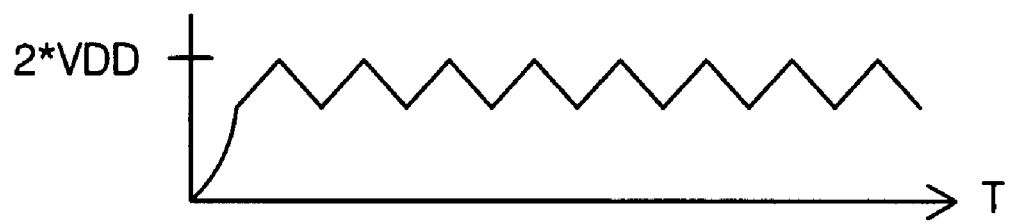
FIG. 1b is a plot of the voltage produced by the known charge pump of FIG. 1.
Figure 2:
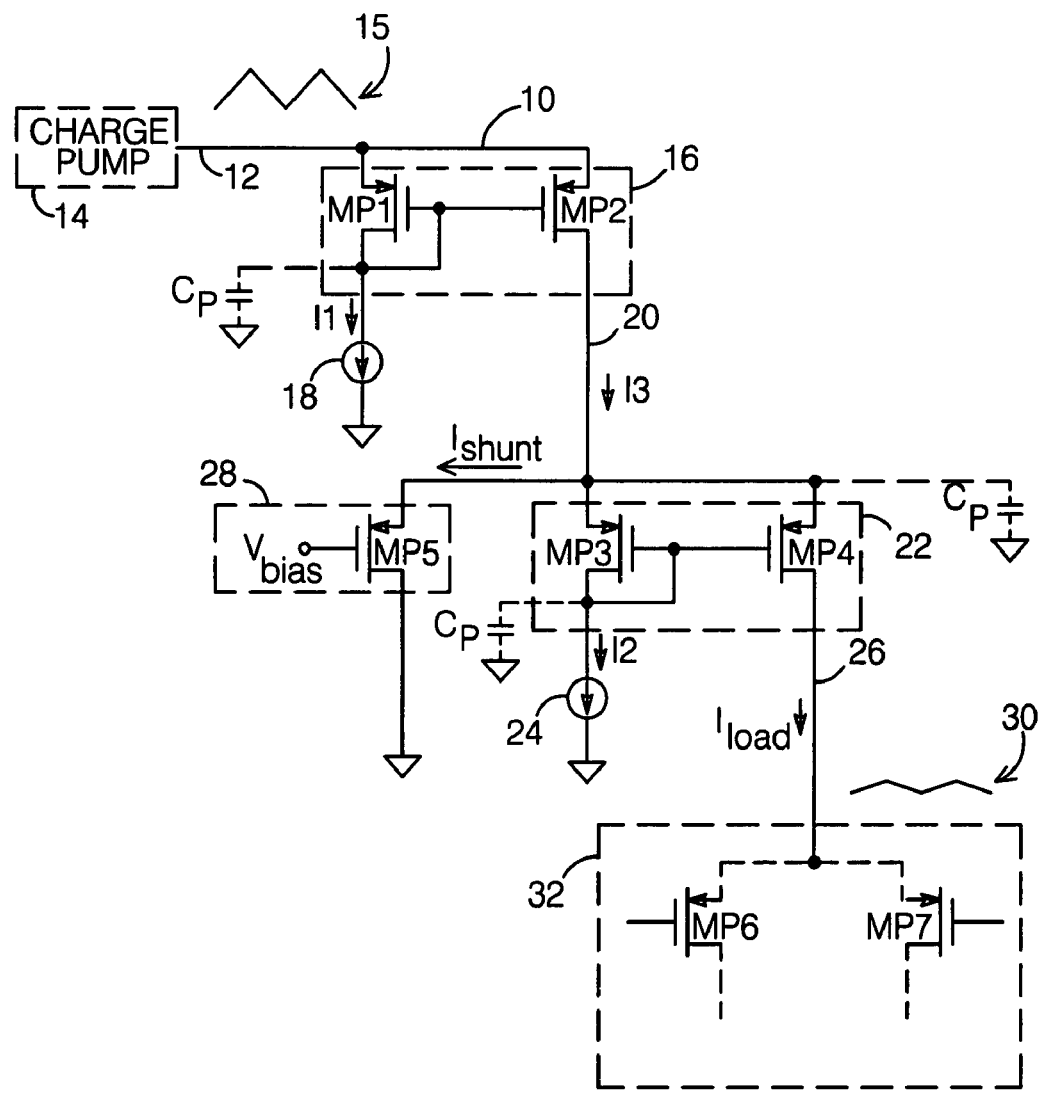
FIG. 2 is a schematic diagram of a ripple current reduction circuit in accordance with the present invention.

An exemplary embodiment of a ripple current reduction circuit in accordance with the present invention is shown in FIG. 2. Note that, while the invention is generally shown and described herein as part of a charge pump configuration, the invention could be beneficially employed to reduce the ripple content of any high ripple voltage source.

A supply node 10 is coupled to the output 12 of a voltage source, suitably a charge pump 14 which produces an output voltage having a high ripple voltage component 15. A first current mirror 16, suitably made from a diode-connected FET MP1 and a FET MP2, is connected such that it is referred to supply node 10, and mirrors a current I1 produced by a current source 18 to a node 20. The mirrored current, I3, includes a ripple current induced by the voltage ripple present in output 12.

A second current mirror 22, suitably made from a diode-connected FET MP3 and a FET MP4, is connected such that it is referred to node 20, and mirrors a current I2 produced by a current source 24 to an output node 26 which serves as the output of the ripple current reduction circuit.

The ripple current reduction circuit also requires that a shunt circuit 28 be coupled between node 20 and a circuit common point such as ground, and be arranged to shunt a portion of the current provided at node 20 to the circuit common point. The ripple current reduction circuit is arranged such that at least a portion of the shunted current ($I_{shunt}$) includes a ripple component, at least a portion of which is induced by the ripple voltage present in the output 12 of the voltage source. By shunting a portion of the ripple current, the current provided at output node 26 has a ripple current 30 having a magnitude which is less than that present in I3.

The primary means by which ripple current is reduced is as follows. Output node 26 is adapted to be coupled to a load 32 which requires a current $I_{LOAD}$. Mirror 22 and current I2 are sized as needed to provide $I_{LOAD}$ at output node 26, and mirror 16 and current I1 are sized to provide a current I3 at node 20 which is greater than that required by mirror 22 to provide $I_{LOAD}$. Mirror 22 is preferably driven by a fixed current source 24, such that mirror 22 presents a nearly constant load on node 20 and mirror 16. As such, the excess current not required by mirror 22 will flow through shunt circuit 28 to the circuit common point. If a ripple voltage is present in output 12, the shunted current will also include a ripple current component, thereby reducing the ripple present at the supply node (20) for mirror 22, and thus at output node 26.

For example, assuming that current mirror 22 has an input current/output current ratio of 1:1, current source 24 is sized such that $I2=I_{LOAD}$. As such, mirror 22 needs to receive a current of at least $I2+I_{shunt}$ from node 20 in order to provide the $I_{LOAD}$ needed by current source 24, and the $I_{LOAD}$ provided to load 32.

Then, for current mirror 16, again assuming a 1:1 current ratio, current source 18 is sized such that $I1>2*I_{LOAD}$; for purposes of example, assume that $I1=3*I_{LOAD}$. In practice, with $I1=3*I_{LOAD}$, the current provided at node 20 will be equal to $3*I_{LOAD}+I_{ripple}$, where $I_{ripple}$ is at least in part due to the ripple voltage present in voltage source output 12. Since mirror 22 presents a nearly constant load of $2*I_{LOAD}$ on node 20, current $I_{shunt}$ will be given by: $I_{shunt}=[3*I_{LOAD}+I_{ripple}]-2*I_{LOAD}=I_{LOAD}+I_{ripple}$. Thus, when so configured, a portion of the ripple current induced in I3 by the ripple voltage in output 12 is forced through shunt circuit 28, thereby reducing the magnitude of the ripple current present in $I_{LOAD}$.

Note that the current mirrors inherently reject the ripple voltage, and that the ripple voltage present in voltage source output 12 does not affect the current at node 20 to a first order approximation. However, parasitic capacitors ($C_P$) associated with the mirror transistors cause currents to flow into the inputs of current mirrors 16 and 22; as a result, the currents provided at nodes 20 and 26 will contain ripple currents based on the size of the parasitic capacitances and the size of the ripple voltage present in voltage source output 12.

Shunt circuit 28 can be implemented in a number of different ways. One possible implementation is a single FET MP5 as shown in FIG. 2, with the FET's source terminal connected to node 20, its drain coupled to the circuit common point, and its gate biased with a voltage $V_{bias}$ selected to provide a desired amount of headroom between node 26 and supply node 10. Load 32 typically requires a known amount of headroom; $V_{bias}$ should be selected such that the voltage at node 20 is sufficient to provide the required headroom at output node 26. Ideally, the shunt circuit presents a low impedance to node 20, as a lower impedance reduces the ripple current passed on to current mirror 22. A PMOS FET as shown in FIG. 2 realizes this goal, due to its low source impedance.

For proper operation, current source 18 must be sized such that I1 is at least $>2*I_{LOAD}$, assuming 1:1 current ratios for current mirrors 16 and 22. There are advantages to making I1 larger than $2*I_{LOAD}$. A larger value for I1 results in a low impedance at node 20, by lowering the impedance at the source of MP5. As noted above, a lower impedance reduces the ripple current from current mirror 22. However, this advantage is offset by the fact that a larger I1 value also requires more power.

Note that it is not required that current mirrors 16 and 22 be arranged to provide 1:1 current ratios. Other ratios, such as 1:2 may be preferred, as this would save power. For example, if mirrors 16 and 22 each had ratios of 1:2, then I2 could be made equal to $0.5*I_{LOAD}$ instead of $I_{LOAD}$, and I1 would only need to be greater than $(1.5/2)*I_{LOAD}$.

The present ripple current reduction circuit is suitably used to provide the tail current for a differential input stage, such as that shown in FIG. 2. In this case, load 32 comprises the common source terminals of differential input transistors MP6 and MP7, and $I_{LOAD}$ is the tail current $I_{tail}$ required by the input stage.

When load 32 is a differential input stage and shunt circuit 28 is implemented with a single FET MP5 as shown in FIG. 2, MP5's gate-source voltage ($V_{gs}$) is preferably greater than that of MP6 or MP7, so that the common-mode input range of the input stage can include positive supply voltage VDD. This could be accomplished by making MP5 with a medium value threshold voltage, and making MP6 and MP7 native devices with low $V_{gs}$ voltages. Alternatively, MP6 and MP7 could be normal PMOS devices, which are scaled to provide the desired headroom.

Figure 3:
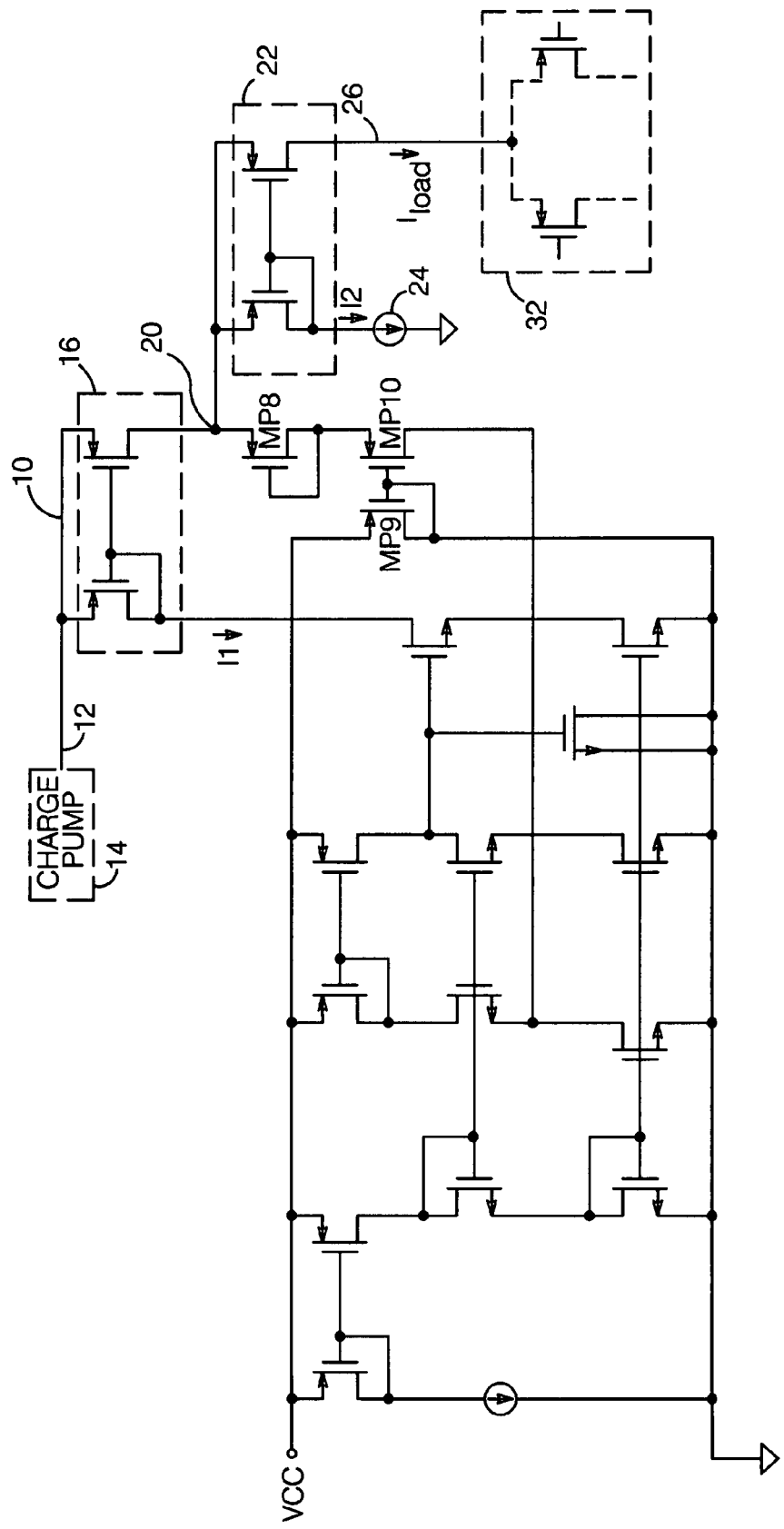
FIG. 3 is a schematic diagram of an alternative embodiment of a ripple current reduction circuit in accordance with the present invention.

One possible embodiment of an enhanced version of the present current ripple reduction circuit is shown in FIG. 3. As before, the circuit includes first and second current mirrors 16 and 22. However, rather than using a single FET for the shunt circuit, a more sophisticated approach is taken. Here, PMOS FETs MP8, MP9 and MP10 perform the function provided by MP5 in FIG. 2, with MP8, MP9 and MP10 used to set the voltage at node 20 in conjunction with the additional circuitry shown, which provides a feedback amplifier which causes a fixed current to flow in MP8 and MP10. This arrangement enables the impedance presented to node 20 to be lower than that possible with the FIG. 2 arrangement. If it is assumed that mirror 22 draws a fixed current, namely $I2+I_{LOAD}$, and that MP10 draws a fixed current as dictated by the feedback amplifier, then there can be no ripple current coming out of mirror 16. This can be achieved because the amplifier increases or decreases I1 in real time to make up for the ripple current that would be induced at the output of mirror 16 due to the voltage supply ripple. As long as the loop prevents the current in MP10 and MP8 from changing, the source voltage of MP8 remains constant, so there is no (or very little) ripple voltage remaining at node 20 to feed into mirror 22. Note that the amplifier implementation shown in FIG. 3 is merely exemplary; many other amplifier designs would be suitable.

Note that, though the circuit implementations described herein have employed FETs, the invention could also be realized with bipolar transistors. It should also be noted that the present circuit could be realized with n-type transistors and arranged to reduce the ripple voltage present in the output of a negative voltage source.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A ripple current reduction circuit, comprising:
 a supply node adapted to be coupled to the output of a voltage source, said voltage source output having an associated ripple voltage;
 a first current source arranged to produce a first current I1;
 a first current mirror referred to said supply node, said first mirror having an input node connected to receive I1 and arranged to mirror I1 to a second node, said mirrored current having an associated ripple current induced by said ripple voltage;

a second current source arranged to produce a second current I2, said second current I2 being a constant fixed current;

a second current mirror referred to said second node, said second mirror having an input node connected to receive I2 and arranged to mirror I2 to an output node; and a shunt circuit coupled between said second node and a circuit common point and arranged to continuously shunt a portion of the current provided at said second node to said circuit common point, at least a portion of said shunted current including a ripple component induced by the ripple current present in said voltage source output;

such that the current provided at said output node has a ripple current having a magnitude which is less than that present in said mirrored current from said first current mirror.

2. The circuit of claim 1, wherein said output node is adapted to be coupled to a differential input stage which requires a tail current $I_{tail}$, said first and second current sources and first and second current mirrors sized to provide $I_{tail}$ at said output node.

3. The circuit of claim 1, wherein said shunt circuit comprises a field-effect transistor (FET) having its source coupled to said second node, its drain coupled to said circuit common point, and its gate coupled to a bias voltage.

4. The circuit of claim 1, wherein said shunt circuit consists of a single field-effect transistor (FET) having its source connected to said second node, its drain connected to said circuit common point, and its gate connected to a bias voltage.

5. The circuit of claim 4, wherein said output node is adapted to be coupled to a differential input stage which requires a tail current $I_{tail}$, said first and second current sources and first and second current mirrors sized to provide $I_{tail}$ at said output node, said differential input stage comprising first and second input FETs having respective gate-source voltages, said single FET having a gate-source voltage which is greater than that of said first or second input FETs.

6. A ripple current reduction circuit, comprising:

a supply node adapted to be coupled to the output of a voltage source, said voltage source output having an associated ripple voltage;

a first current source arranged to produce a first current I1;

a first current mirror referred to said supply node, said first mirror having an input node connected to receive I1 and arranged to mirror I1 to a second node, said mirrored current having an associated ripple current induced by said ripple voltage;

a second current source arranged to produce a second current I2;

a second current mirror referred to said second node, said second mirror having an input node connected to receive I2 and arranged to mirror I2 to an output node; and a shunt circuit coupled between said second node and a circuit common point and arranged to shunt a portion of the current provided at said second node to said circuit common point, at least a portion of said shunted current including a ripple component induced by the ripple current present in said voltage source output, said shunt circuit consisting of a single field-effect transistor (FET) having its source connected to said second node, its drain connected to said circuit common point, and its gate connected to a bias voltage;

such that the current provided at said output node has a ripple current having a magnitude which is less than that present in said mirrored current from said first current mirror;

said output node adapted to be coupled to a differential input stage which requires a tail current $I_{tail}$, said first and second current sources and first and second current mirrors sized to provide $I_{tail}$ at said output node, said differential input stage comprising first and second input FETs having respective gate-source voltages, said single FET having a gate-source voltage which is greater than that of said first or second input FETs;

wherein said input stage FETs are native devices.

7. The circuit of claim 1, wherein said shunt circuit comprises a feedback amplifier circuit arranged to vary said first current I1 such that said shunted current remains approximately fixed.

8. A ripple current reduction circuit, comprising:

a supply node adapted to be coupled to the output of a voltage source, said voltage source output having an associated ripple voltage;

a first current source arranged to produce a first current I1;

a first current mirror referred to said supply node, said first mirror having an input node connected to receive I1 and arranged to mirror I1 to a second node, said mirrored current having an associated ripple current induced by said ripple voltage;

a second current source arranged to produce a second current I2;

a second current mirror referred to said second node, said second mirror having an input node connected to receive I2 and arranged to mirror I2 to an output node; and a shunt circuit coupled between said second node and a circuit common point and arranged to shunt a portion of the current provided at said second node to said circuit common point, at least a portion of said shunted current including a ripple component induced by the ripple current present in said voltage source output;

such that the current provided at said output node has a ripple current having a magnitude which is less than that present in said mirrored current from said first current mirror;

wherein said output node is adapted to be coupled to a load which requires a current $I_{LOAD}$, said second current source and mirror sized to provide $I_{LOAD}$ at said output node, and said first current source and mirror sized to provide a current at said second node which is greater than that required by said second mirror to provide $I_{LOAD}$, the difference between the current provided at said second node and that required by said second mirror to provide $I_{LOAD}$ being shunted by said shunt circuit to said circuit common point.

9. The circuit of claim 1, wherein said output node is adapted to be coupled to a load which requires a predetermined amount of headroom, said shunt circuit arranged such that the voltage at said second node is sufficient to provide said required headroom at said output node.

10. The circuit of claim 9, wherein said shunt circuit comprises a field-effect transistor (FET) having its source coupled to said second node, its drain coupled to said circuit common point, and its gate coupled to a bias voltage selected such that the voltage at said second node is sufficient to provide said required headroom at said output node.

11. The circuit of claim 1, wherein said voltage source comprises a charge pump which provides an output having said associated ripple voltage.

12. A low noise charge pump, comprising:
- a supply node adapted to be coupled to the output of a charge pump, said charge pump output having an associated ripple voltage;
- a first current source arranged to produce a first current I1;
- a first current mirror referred to said supply node, said first mirror having an input node connected to receive I1 and arranged to mirror I1 to a second node, said mirrored current having an associated ripple current induced by said ripple voltage;
- a second current source arranged to produce a second current I2;
- a second current mirror referred to said second node, said second mirror having an input node connected to receive I2 and arranged to mirror I2 to an output node, said first and second current sources and current mirrors arranged such that said second current mirror provides an approximately constant load on said first current mirror;
- said output node adapted to be coupled to a load which requires a current $I_{LOAD}$, said second current source and mirror sized to provide $I_{LOAD}$ at said output node and said first current source and mirror sized to provide a current I3 at said second node such that I3 is greater than the current required by said second mirror to provide $I_{LOAD}$; and
- a shunt circuit coupled between said second node and a circuit common point and arranged such that the difference between I3 and the current required by said second mirror to provide $I_{LOAD}$ is shunted by said shunt circuit to said circuit common point, at least a portion of said shunted current including a ripple component induced by the ripple current present in said charge pump output;
- such that the current provided at said output node has a ripple current having a magnitude which is less than that present in said mirrored current from said first current mirror.

13. The charge pump of claim 12, wherein said first current source and mirror are sized such that current I3 is greater than I2+$I_{shunt}$, where $I_{shunt}$ is said shunted current.

14. The charge pump of claim 13, wherein said first current source and mirror are sized such that current I3 is about equal to 3*$I_{LOAD}$.

15. The charge pump of claim 12, wherein the current required by said second mirror to provide $I_{LOAD}$ is about equal to 2*$I_{LOAD}$, and said first current source and mirror are sized such that current I3 is about equal to 3*$I_{LOAD}$, such that said shunt circuit shunts a current about equal to $I_{LOAD}$ to said circuit common point.

16. The charge pump of claim 12, wherein said current mirrors have a ratio of 1:1.

17. The charge pump of claim 12, wherein said current mirrors have a ratio 1:X, where X is greater than 1.

* * * * *